United States Patent
Hild et al.

(10) Patent No.: US 6,532,368 B1
(45) Date of Patent: Mar. 11, 2003

(54) SERVICE ADVERTISEMENTS IN WIRELESS LOCAL NETWORKS

(75) Inventors: Stefan G. Hild, Adliswil (CH); Dirk Husemann, Adliswil (CH); Michael Nidd, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,686

(22) Filed: Jan. 19, 2000

(30) Foreign Application Priority Data

Jan. 25, 1999 (EP) .............................. 99101282

(51) Int. Cl.[7] .................................. H04B 7/00
(52) U.S. Cl. ........................... 455/515; 455/522
(58) Field of Search ........................ 705/1, 10, 14; 370/310, 311, 338, 349; 455/414, 515, 522, 434; 707/202

(56) References Cited

U.S. PATENT DOCUMENTS

| | | | | |
|---|---|---|---|---|
| 5,258,981 A | * | 11/1993 | Davey et al. | 370/311 |
| 5,276,680 A | * | 1/1994 | Messenger | 455/517 X |
| 5,319,641 A | * | 6/1994 | Fridich et al. | 370/451 |
| 5,465,392 A | * | 11/1995 | Baptist et al. | 455/522 X |
| 5,555,266 A | * | 9/1996 | Buchholz et al. | 455/515 |
| 6,026,297 A | * | 2/2000 | Haartsen | 455/414 X |

FOREIGN PATENT DOCUMENTS

| | | | | |
|---|---|---|---|---|
| WO | WO 95/01020 | * | 1/1995 | 455/515 X |
| WO | WO 97/04611 | * | 2/1997 | 455/414 X |
| WO | WO 98/10538 | * | 3/1998 | 455/434 X |

* cited by examiner

*Primary Examiner*—Stephen Gravini
(74) *Attorney, Agent, or Firm*—Louis J. Percello; F. Chau & Associates, LLP

(57) ABSTRACT

A device and method for advertising service offerings in a communications network. A service offering includes information about the device making the advertisement, including what functions the device may serve. The advertisement also includes information about other devices in the network, when that information is available. Each device in the network determines a time value, at the end of which the device will send an advertisement. Each device listens for advertisements from other devices up to the time previously determined. If a device receives an advertisement that contains information about itself then the device will determine a new time value, at the end of which the device will send an advertisement. If a device receives an advertisement that does not contain information about itself then the device will send its own advertisement.

46 Claims, 6 Drawing Sheets

SERVICE ADVERTISEMENTS IN WIRELESS LOCAL NETWORKS

BACKGROUND OF THE INVENTION

1. Field of the Invention

The invention concerns wireless local area networks and the communications between the devices forming such a network. More specifically, the present invention relates to a communication scheme which allows devices within the wireless local area network to announce their service and/or discover services provided by other devices.

2. Description of the Related Art

Computer terminal and peripherals have become dramatically smaller and more portable. Personal computers and peripherals are small enough to sit on the desk at work. Smaller still are lap top computers and notebook computers. There are computer terminals which are small enough to be mounted in a vehicle such as a delivery truck. Still smaller are the hand-held terminals typically used for their portability features where the user can carry the terminal in one hand and operate it with the other. A physical connection of the above devices by means of cables or fibers may have drawbacks, such as configuration constraints which limit the number of peripherals that can be attached or cumbersome reconfiguration of hardware devices. Note that there are some cable or fiber-based communication systems where the limited number of ports on the computer may not limit the number of peripherals. Ethernet is one example of a communications system where the cable is used as a shared medium (other examples are token ring, FDDI (Fiber Distribution Data Interface), and DQDB (Distributed Queue Dual Bus)).

The smaller the devices get, the more important it becomes to replace fixed physical connections with wireless ad-hoc connections (e.g. body networks, radio frequency connections, or infrared connections), since physically connecting the computer terminals, peripherals, and other devices by means of cables or fibers severely reduces the efficiency gained by making the units smaller. Ad-hoc connections are required where devices are moved within an area, enter an area, or exit an area. The term "ad-hoc" refers to the need for frequent network reorganization.

Local area communication is rapidly evolving into what can be called personal local area networks, which are networks for communication between local peers or subsystems. These networks will herein be referred to as local networks. Wireless communication is of particular importance in such local networks. There are wireless communication approaches that have been developed and designed with an eye on the communication between peers or subsystems of such local networks.

A typical example of a local network is the personal area network (PAN) which grew out of work between two research groups at the Massachusetts Institute of Technology's (MIT) Media Laboratory. The PAN technology uses a tiny electrical current to transmit a user's identification and other information from one person to another, or even to a variety of everyday objects such as cars, public telephones, and automated teller machines (ATMs). Information is transferred via microprocessors that are placed in PAN transmitters and receivers the size of a thick credit card. The digital data is then sent or received via a tiny external electric field. The small signal is conducted by the body's natural salinity and carries the information, unnoticed, through the body. The natural salinity of the human body makes a person an excellent conductor of electrical current. The PAN technology takes advantage of this conductivity. The low frequency and power of the signal ensures that the information, which is coded to the individual, does not travel beyond the body and can only be received by something, or someone, in contact with the body. The speed at which the information is currently transmitted is equivalent to a 2400-baud modem. Theoretically, 400,000 bits per second could be communications using this method. The PAN is a typical example of an ad-hoc body network which does not require any fixed cabling or the like.

The PAN technology has potential applications in business, medical, retail, and even in personal arenas. Business associates could, for example, exchange electronic business cards with a handshake, corporate security devices could automatically log users on and off computer systems, and subway commuters could pay for a ride by walking through a turnstile. PAN technology could also enable people to carry digital versions of their medical records for instant access by emergency medical technicians; calling card numbers could automatically be sent from a wallet to a payphone; and ATMs and automobiles would be able to immediately distinguish their owners as they approach. Another application lies with securities traders, needing the ability to quickly and reliably log on and off while on the trading floor, for entering purchases and sales. Even household devices, such as CD players, televisions and toasters, could identify and adapt to individual preferences and tastes using PAN technology. The PAN networks are usually point to point where the human body serves as a broadcast communications medium.

GTE Corporation has developed a short-range radio-frequency (RF) technique which is aimed at giving mobile devices such as cellular phones, pagers, and handheld personal computers (PCs) a way to interact with one another. GTE's technique is tentatively named Body LAN (local area network). The original development of Body LAN was via a wired vest with which various devices were connected (hence the name Body LAN). This graduated to an RF connection.

Xerox Corporation has developed a handheld computing device called PARC TAB. The PARC TAB is portable yet connected to the user's office workstation through base stations which have known locations. The PARC TAB base stations are placed around a building, and wired into a fixed wired network. The PARC TAB system uses a preset building layout and identifiers of the various base stations to determine its location based on the strongest base station signal. A PARC TAB portable device has a wireless interface to the base stations. The PAC TAB system assumes that the PARC TAB portable device is always connected to the network infrastructure. The location of each portable PARC TAB device is always known to the system software. The base stations establish regions and are connected to power supplies. PARC TAB communication systems have a star topology.

In an attempt to standardize data communication between disparate PC devices several companies, including Ericsson, IBM, Intel, Nokia, and Toshiba established a consortium to create a single synchronization protocol (code-named Bluetooth) to address problems arising from the proliferation of various mobile devices. There are many other adaptor companies. The proposed solutions would automatically synchronize mobile devices when end-users enter their offices. Enabling seamless voice and data transmissions via wireless, short-ranged ratio, the Bluetooth technology will allow users to connect to a wide range of devices easily and quickly, without the need for cables, expanding communications capabilities for mobile computers, mobile phones and other mobile devices. The Bluetooth operating environment is not yet fully defined, but there are expected to be similarities with the IrDA (Infrared Data Association) specification and the Advanced Infrared (ALr) specification. Further developments in Bluetooth may stem from the IEEE standard 802.11 and/or HIPERLAN, as promulgated by the European Telecommunications Standards Institute (ETSI).

Bluetooth radio technology provides a mechanism to form small private ad-hoc groupings of connected devices away from fixed network infrastructures. Bluetooth makes a distinction between a master unit, which is a device whose clock and hopping sequence are used to synchronize all other devices, and slave units in the same network segment. In other words, the Bluetooth approach is centralized. A query-based discovery scheme is used for finding Bluetooth devices with an unknown address. Queries are also centralized at a registry server. A drawback of such a centralized approach is the presence of a centralized point of failure. Another disadvantage of such a system includes the overhead required, as compared to a distributed scheme. The main problem of a centralized system is in locating a single registry server, and what to do if it disappears. If two random devices encounter each other they must first recognize each other's presence, then decide which is the registry server, and then go about their business of communicating. This continual selection and re-selection of a leader causes the increased overhead. The alternative is to expect users to carry one device as the leader at all times. This, however, is not always a practical option. Further details can be found in Haartsen, Allen, Inouye, Joeressen, and Naghshineh, "Bluetooth: Vision, Goals, and Architecture" in the Mobile Computing and Communications review, Vol. 1, No. 2. Mobile Computing and Communications review is a publication of the ACM SIGMOBILE.

HomeRF based on Shared Wireless Access Protocol (SWAP), is another example of an operating environment which can be used to connect devices. A HomeRF Working Group was formed to provide the foundation for a broad range of interoperable consumer devices. The goal of the HomeRF Working group is to establish an open industry specification for wireless digital communication between PCs and consumer electronic devices anywhere in and around the home. The working group, which includes the leading companies from the personal computer, consumer electronics, peripherals, communications, software, and semiconductor industries, is developing a specification for wireless communications in the home called SWAP. The HomeRF SWAP system is designed to carry both voice and data traffic, and to operate in conjunction with the Public Switched Telephone Network (PSTN) and the Internet. The HomeRF SWAP system operates in the 2400 MHz band and uses a digital frequency hopping spread spectrum radio. The SWAP technology was derived from extensions of existing cordless telephone (DECT) and wireless LAN technology to enable a new class of home cordless services. It supports a time division multiple access (TDMA) service to provide delivery of interactive voice and other time-critical services. SWAP also supports a carrier sense multiple access/collision avoidance (CSMA/CA) service for delivery of high speed packet data. The SWAP system can operate either as an ad-hoc network or as a managed network under the control of a connection point. In an ad-hoc network, where only data communication is supported, all stations are equal and control of the network is distributed between stations. For time critical communications such as interactive voice, the connection point, which provides the gateway to the PSTN, is required to coordinate the system. Stations use the CSMA/CA to communicate with a connection point and other stations. The Swap specification 1.0 is incorporated by reference in its entirety.

The above-mentioned IEEE 802.11 standard for wireless LAN medium access control comprises features for conserving power. At regular intervals, with small random time offsets, LAN members broadcast information about themselves only. If a device receives such a broadcast while it is preparing one itself, it will not broadcast that round. In this way, all devices broadcast their individual characteristics with statistically even distribution. Because the medium access control (MAC) layer is given a specific addresses to which it directs transmissions, its image of the LAN does not need to be up-to-date. It is a clear disadvantage of the approach promulgated in IEEE 802.11 is that it may take some time until a newly arrived device or an absent device is announced/noticed. IEEE 802.11 LANs are centralized, star-shaped networks. It should also be noted that the 802.11 advertisements contain only communications characteristics and individual identify, not service offerings.

There are several more or less elaborate protocols and techniques that allow an ad-hoc wireless communication between mobile devices. The above described Bluetooth radio technology and HomeRF approach are prominent examples. All state-of-the-art protocols and techniques have certain drawbacks, as briefly addressed in the following section.

For seamless connection in an ad-hoc local network, the respective devices require a method for becoming aware (discovery) of the services offered by neighbors. In addition, the devices in such a network must make their own services known (advertisement). On one hand, the discovery and advertisement of services offered in a local network must be carried out in a timely manner, but on the other hand battery power must be conserved if portable devices are employed. A local network where entering the network is seamless such that the device can easily change locations is also desirable. It is desirable that no user intervention is required if a device enters or leaves an ad-hoc network. For example, it may be arduous if the user was required to pre-form a reconfiguration. It is also desirable that a device should be able to leave the network without formal notification.

SUMMARY OF THE INVENTION

It is an object of the present invention to provide a scheme for introducing a new device into an ad-hoc wireless local network. It is an object of the present invention to provide a scheme for a device in an ad-hoc wireless local network to announce its services to another device in the local network. It is an object of the present invention to provide a scheme for a device in an ad-hoc wireless local network to discover services provided by other devices in the local network.

The present invention concerns an apparatus for exchanging service information with other devices. The present apparatus comprises a transceiver, a processing unit, a memory for storing information about its local services and/or services provided by other devices, and a protocol resource manager.

This protocol resource manager performs the following steps. It triggers the transceiver to send service information, comprising information about itself and/or other known devices to other devices. It chooses a timeout value $T_A$. The protocol resource manager ensures that the apparatus listens for up to a maximum time $T_A$ for service information received by the transceiver. If $T_A$ timed out without having received such service information by the transceiver, it triggers the transceiver to send service information, as stated above. If such service information was received by the transceiver prior to $T_A$ timing out, the protocol resource manager checks whether the service information received comprises information about itself. If it does, then it chooses another timeout value $T_A$, and continues listening as stated above. If the protocol resource manager does not find that the information received contained information about itself, it triggers the transceiver to send the service information, as stated above.

The present invention also concerns a scheme for advertising service offerings in a communications system comprising two devices. The first device sends service information, comprising information about itself and/or other known devices. The first device chooses a timeout value $T_A$, and listens for up to the maximum time $T_A$ for service information sent by another device. If $T_A$ timed out it sends the service information, as stated above. Otherwise, the first device checks whether the service information sent by another device comprises information about itself (local services). If the information does contain the information about itself it continues by choosing a timeout value $T_A$, as stated above, otherwise the device sends the service information as stated above.

The present invention relates generally to local networks and more specifically, to a communication scheme which allows devices within the local network to announce their service and/or to discover services provided by other devices while limiting the power drain on battery powered devices. The present local networks typically have a hybrid mesh topology where a device may communicate with any other device. A peripheral device for instance may communicate with another peripheral device without a relay station or base station being involved.

The present solution combines advertisements and/or discovery with membership renewals. The general approach is that a group of devices will take turns broadcasting (advertising) a list of services (hereinafter referred to as service information) available. By using variable transmission delays that are reset when other advertisements are seen, and adjusting the distribution of these delays, new devices can quickly be identified, and absent machines can be noticed. The present invention provides a mechanism to form small private ad-hoc groupings of connected devices away from a fixed network infrastructure. With this invention, a solution is presented that, when used in combination with a wireless communication protocol, allows a network to be formed ad-hoc if needed, and dissolved if not needed anymore. According to the present invention a network of all eligible proximate devices (devices that will allow themselves to be networked) can be set up while allowing new devices to join and leave seamlessly.

All devices that form an ad-hoc grouping, according to the present invention, do not necessarily have identical implementations (from a software and/or hardware point of view) as long as at least the present service discovery protocol is implemented in all these devices.

One device may act as a master and the other(s) as slave(s). A device may be put into a power-saving mode in which the device activity is lowered. It is an advantage of the present scheme that battery power is conserved by using only a small number of transmissions.

The present scheme facilitates implementations where entering a local network is seamless in that it does not require user intervention. The present scheme also facilitates implementations where a device is able to leave a local network without formal notification.

Further advantages include: automatic adjustments to changes in the local area network; traffic volume is kept low; a device within a local network according to the present invention may change place in real time, a device may turn on or off arbitrarily, while the other devices within the vicinity monitor its appearance/disappearance on the network without posing an interference to any ongoing communication. Not all of the advantages above have to be realized in an implementation of the present scheme.

BRIEF DESCRIPTION OF THE DRAWINGS

The invention is described in detail below with reference to the following schematic drawings. It is to be noted that the Figures are not drawn to scale.

DETAILED DESCRIPTION OF PREFERRED EMBODIMENTS

Figure 1:
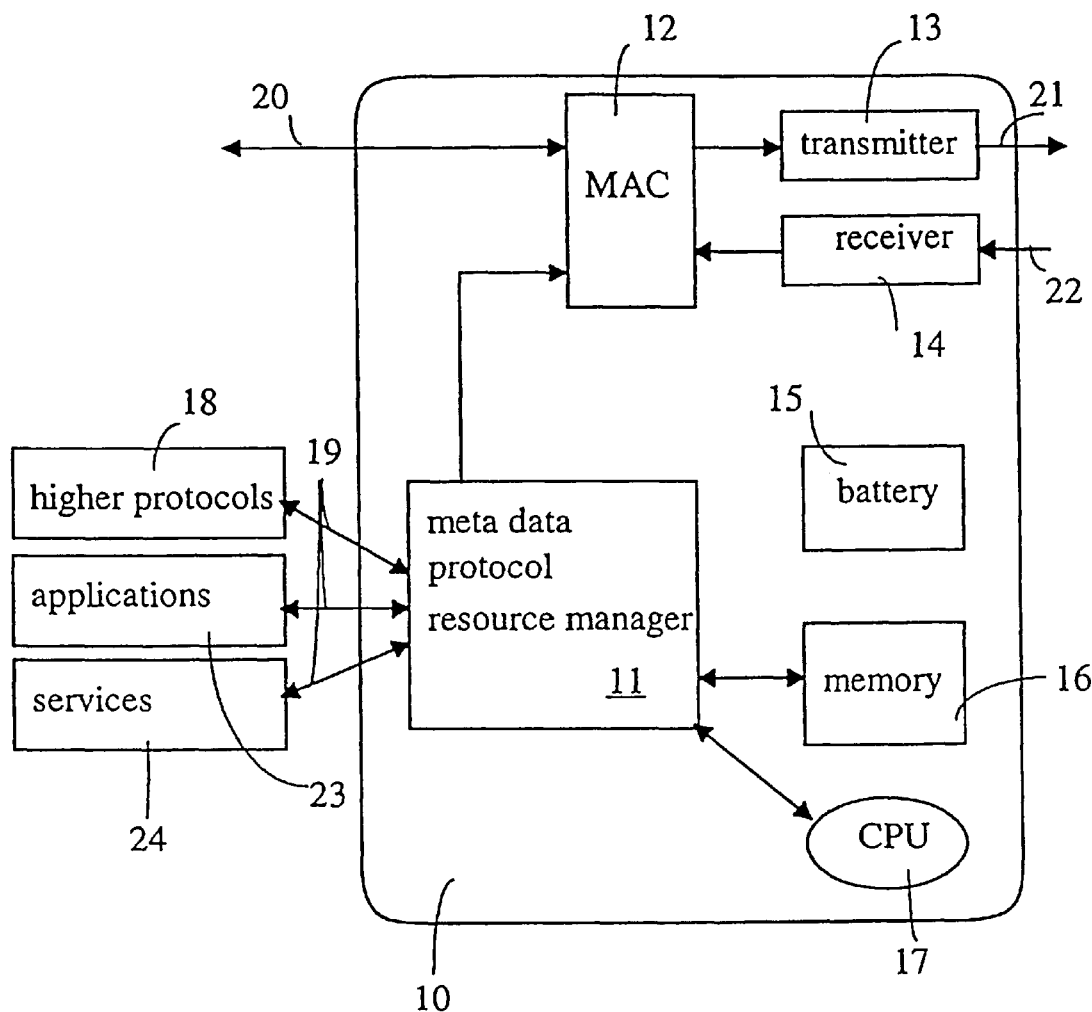
FIG. 1 is a schematic block diagram of a first embodiment, in accordance with the present invention.

A preferred embodiment of the present invention will be described below in more detail with reference to the accompanying drawings. For purposes of the present description, a local network is defined as being a network composed of at least two devices within mutual communication range of each other. Within such a local network the devices communicate with each other without the need for a wired network. The local network may be established by means of infrared (IR), radio-frequency (RF), HomeRF, or other means, such as the user's body, as in the case of the PAN, for example. A local network does not need to have an access point for connection to a fixed network. The local network may be completely isolated from any other network, or it may comprise one or more access points which provide the (wireless) devices with access to the wired network.

The specific range that constitutes a local network is accordance with the present invention depends on actual implementation details. Generally, a local network can be described as having a coverage area between a few square meters and a few hundred square meters. Under certain circumstance the communication range might even go beyond that which is described above.

The present networking scheme can be used in warehouses, on manufacturing floors, in offices, on trading floors, in private homes, in cars and trucks, in airplanes, and outside of buildings, just to mention some examples.

When referring to a device, this disclosure is referring to any device capable of becoming part of a local network. Examples of devices-are: laptop computers, workpads, notepads, personal digital assistants (PDAs), notebook computers and other wearable computers, desktop computers, computer terminals, networked computers, internet terminals and other computing systems, set- top boxes, cash registers, bar code scanners, point of sales terminals, kiosk systems, cellular phones, pagers, wrist watches, digital watches, badges, and smart cards. Other contemplated devices include: headsets, Human Interface Device (HID) compliant peripherals, data and voice access points, cameras, printers, fax machines, keyboards, joysticks, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, or articles of clothing. In addition to a "smart wallet" computer, there are a number of other variations of the wearable computers. A "belt" computer is such a variation which allows the user to surf, dictate, and edit documents while they are moving around. Yet another example is a child's computer which is comparable to a personal digital assistance for grade-school children. The child's computer may hold assignments, perform calculations, and help the child manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might comprise the present invention.

The present invention requires the transmission of service information. Any kind of service description can be used to describe the services in a format which can be processed by the devices. One preferably uses a service description which is optimized so that transmissions are efficient. The service description should be flexible and extensible. In the present context, the type of service is described by means of a so-called service identifier. An example of a service identifier is a simple flag or bit combination which describes standard types of services. These standard types of services may be predefined such that they can be identified by such a simple flag or bit combination. The service identifier can also be any other kind of information which is suited to identify one or several services offered. In addition to identifying a type of service one may have to set or define certain parameters and options (hereinafter referred to as service parameters). This is now explained in connection with an example. A printer announces to another device within reach that it provides printing services by sending the respective service identifier. In addition, it might want to inform the other device that it has A4 paper in one tray and A3 paper in another tray. This information is transmitted in the form of service parameters. Further, security features may be built into the service parameters to protect certain transmission An error correction scheme may be used to ensure that the transmission of service information is reliable. Further, the service information may comprise details on the kind of device which is offering services (hereinafter referred to as device identifier). Examples of device identifiers include but are not limited to MAC addresses and the like. Device identifiers are optional however.

Network topology: The present scheme can be used in local networks with point-to-point and/or point-to-multipoint connections. Several network segments (groups) may be established and linked together ad-hoc. The network topology is at a lower-level than the subject of the present invention. Aspects of the network topology are only addressed to the extent necessary. Note that the present invention is independent of the network topology and may be used on any kind of network topology allowing broadcast. Most implementations of the present scheme have a mesh topology. It is also possible to use the present scheme in a star-shaped or ring-shaped topology.

Network technology: The present scheme can be used in connection with any kind of wireless communication technique, such as RF, IR, body networks (i.e. PAN), and the like.

Well suited is the Bluetooth communications scheme, which is described in the Haartsen, Allen, Inouye, Joeressen, and Naghshineh, "Bluetooth: Vision, Goals, and Architecture" in the Mobile Computing and Communications review, Vol.1, No. 2. Mobile Computing and Communications Review is a publication of the ACM SIGMOBILE. This reference is incorporated by reference in its entirety.

The basic concept of the present invention is described in the following. An advertisement is service information (e.g. a list of entries), identifying services known to the transmitting device. An advertisement may include local services, those provided by the transmitting device. The advertisement may also include remote services, those provided by devices other than the transmitting device, with which a communication channel exists (either direct of through an intermediary device). Service information is associated with an expiry time or a number that ages out by increasing or decreasing. An example of a method to maintain this expiry time would be to use an absolute time of day, and include the local clock value at the time of transmission in each advertisement, allowing other devices to adjust the times to their local clocks.

Each device may, from time to time, send its own service information as an advertisement. The advertisement may include the service of other devices in the network. The probability of a device sending an advertisement may depend on time since the last advertisement was broadcast (sent or received). The advertisement may include the latest expiry time values for services (setting expiry times for its own service in the process). If a device recognizes that its own local services may timeout within a given time, it may adjust its broadcast delay distribution to make it more likely to transmit soon, thus renewing the expiry time of its local services.

The present scheme does not foresee any master device or base station. According to the present invention a local network may be established without a base station. The present scheme works everywhere provided that there are at least two devices that support the present scheme.

When an advertisement is received (discovery), the receiving device updates an internal list of available services from the received service information. This involves updating timeouts for services already known, and adding entries for new services. This may also be a time to remove expired entries.

The present scheme may be asymmetric in that a typical device is mainly listening. This is advantageous because receiving (discovering) advertisements may consume less battery power than actively sending advertisements. Asymmetric in this example means that a device receives advertisements from other devices more often than it sends advertisements. A device in the listening state does not necessarily continually listen. A device may periodically listen for advertisements from other devices.

The present invention also provides for a device that may adjust its activity based on its available power resource and the power resources of the other devices. For example, a device connected to a power grid may advertise more frequently then those devices operating on battery power. A first device operating on battery power may adjust its expiry time to conserve power. A second device connected to a power grid, may increase the frequency of its transmissions. The first device will receive these transmissions. Thus, as a result of receiving the increased number of advertisements from the second device, the first device may further adjust its expiry time to decrease the frequency of its advertisements.

The systems according to the present invention are completely distributed, no device is more important to the network than any other device. According to the present invention local network partitions or the loss of a single device may not affect the robustness of the network. New devices will promptly receive a full list of services available in a new network segment. This is an advantage because the membership algorithm does not have to sense when an area or segment has been left or entered. Thus, the state of a device is independent of its environment, and the algorithm is easily implemented.

The IEEE 802.11 standard for wireless LAN medium access control has features that allow power conservation as well. According to this standard, IEEE 802.11 LAN members broadcast information about themselves at regular intervals, with small random time offsets. These LAN members broadcast only information about themselves. They do not advertise information about the services offered by other devices. If an IEEE 802.11 LAN member receives such a broadcast while it is preparing one itself, it will not broadcast that round. In this way, all devices broadcast their individual characteristics with statistically even distribution. Note that the present approach is different in that the advertisements occur in a non-even statistical distribution. In other words, if one describes the probability of having transmitted an advertisement as a function of time, assuming that no other advertisements are transmitted, the present scheme would not necessarily produce the same curve for all devices. The probability of any particular device transmitting an advertisement during a given "advertising cycle" would be 1/n for n devices operating in an IEEE 802.11 network, but may be different for each device operating in a network in accordance with the present invention. This allows weaker devices, i.e. those devices that have less available power, to advertise less frequently.

Because the IEEE 802.11 MAC layer is given specific device addresses to which it directs transmissions, its image of the LAN does not need to be as timely as the present invention. The chief difference is that in the present invention, the full list is more quickly communicated to new arrivals, and absent devices are more quickly identified.

The following example of the present scheme is described in connection with FIG. 1. FIG. 1 is a schematic block diagram of the components of a device 10, in which the present invention is implemented. The device 10 comprises a transmitter 13 for sending information via an output channel 21 to another device, and a receiver 14 for receiving through an input channel 22, information form another device. Note that in the present embodiment there are two channels 21 and 22. These channels can be any kind of shared media channel, such as an IR, RF, or body network channel, for example. These channels do not have to be the same. It is conceivable that the output channel 21 is an infrared channel whereas the input channel 22 is a RF channel.

The transmitter 13 and receiver 14 communicate with a medium access control (MAC) unit 12. The MAC layer is well defined by international standards (cf. ISO OSI(Open Standards Interconnection) reference model as described in A. S. Tannenbaum's book "Computer Networks.") and the MAC unit 12 may be a conventional unit employed in communications systems to control the MAC layer. Note that a MAC layer is a logical division, and would be only logically divided from other parts of the protocol implemented at 11 on the same physical device. The MAC unit 12 may be employed to detect and/or avoid collisions. In the present embodiment the MAC unit 12 is used to send and receive broadcast packets. The device 10 has a power supply 15. In the present example the power is provided by a battery. Likewise, the power may be provided via a power plug, a solar cell, or the like. The power supply provides power to the components of the device 10. The respective circuit lines or cables are not shown in FIG. 1.

Meta data is fed from a meta data protocol resource manager 11 to the MAC unit 12. "Meta data" refers to information about the protocols and/or services, as opposed to "user data," which may be useful in applications. In the present context, meta data mainly refers to services (e.g. provided in the form of a list of services). The meta data protocol resource manager 11 is connected to a memory 16 and a central processing unit (CPU) 17. The resource manager 11 communicates by means of application programming interfaces (APIs) 19 with other units such as higher protocol blocks 18, applications 23, or services 24. The units 18, 23, and 24 are shown in FIG. 1 to indicate that the present scheme enables many different protocols and/or applications and/or services. These protocols, applications, and services can be built on top of the present scheme.

Note that the MAC 12 and the resource manager 11 are logical constructs. They can be implemented on separate devices or incorporated into a program stored in memory. If incorporated into a program, the device 10 may physically be the same as any other conventional device, except that it comprises the above-mentioned program. This program comprises an instruction that, if processed by the CPU 17, makes the device 10 perform the steps according to the present invention.

The MAC unit 12 also receives normal data (hereinafter user data) via line 20. The resource manager 11 implements at least part of the present service exchange. It allows services to be discovered and matched in useful ways by exchange of meta data (e.g. service information). This process may not affect the transmission of user data.

To draw an analogy, consider a pay-phone: when one lifts the handset, a tone is sent to the switch, causing it to reserve a transceiver at the switching station for managing communication with that remote unit (the pay-phone). One then puts money into the phone, causing more tones to be sent to the switch to identify the amount. These tones are acknowledged using more special tones. Based on this information, a service connection is made. Now user data (your destination phone number) also uses special tones, but these are part of a different (higher-level) protocol common to all phones, regardless of underlying billing system, etc. This is user data, as is the analogue voice transmission that follows. At the end of the call, more tomes from the switch tell the phone to swallow the money. The user does not care how this protocol works. The only important thing about it is that the correct amount is charged, and that a connection is established.

The present service (resource) discovery scheme uses the same communication channel as the user data. However, it sends information about the services that are available (meta data or service information) rather than information actually used by those services (user data). Information is usually transferred in packets that are labeled with some destination information. If this information marks them as relating to resource availability, they will be routed through 11. If they are marked for user applications, they will bypass 11 via line 20 directly to the applications, services, and higher protocols identified as 18, 19, and 24. Note that there is no clear distinction between services and applications. Some services are applications, but not all applications are services. In other words, services are subsets of applications.

Those skilled in the art will understand that the device 10 illustrated in FIG. 1 is only one example of a device implementing the present invention and that the configuration and construction of the various elements of the device 10 uses well-known hardware and/or software. Those skilled in the art will recognize that many modifications and changes can be made to the particular embodiment described in connection with FIG. 1 without departing from the spirit and scope of the invention.

An algorithm in accordance with the present invention will now be addressed. Aspects of this algorithm are illustrated in the form of flow charts. Note that certain steps shown in the flow chart do not necessarily have to be executed/performed in the given order. The present algorithm combines data advertisements with membership renewals. The general approach is that the devices in a group of devices will take turns broadcasting service information comprising information about available services. By using variable transmission delays $T_X$ that are reset using random transmission delays when another advertisement broadcast is seen, and adjusting the distribution of these transmission delays, new devices can quickly be identified and absent devices can be noticed.

The present scheme can be implemented such that a device with better power availability (e.g. a device which is connected to a power supply) broadcasts advertisements more frequently than other devices. Thus, the bulk of transmission requirements may be shifted to devices with better power availability. Service Advertisements Procedure: An advertisement is a message that comprises information concerning services known to the transmitter. This includes both local services existing on the transmitting device, those services provided or rendered by the transmitter, and remote services existing on another device, if available. Information concerning services may be transmitted in the form of a list of entries identifying the respective services of different devices. Entries are associated with an expiry time. An example of a way to maintain this expiry time would be to use an absolute time of day, and include the local clock value at the time of transmission in each advertisement, allowing other devices to adjust the times to their local clocks.

Figure 2A:
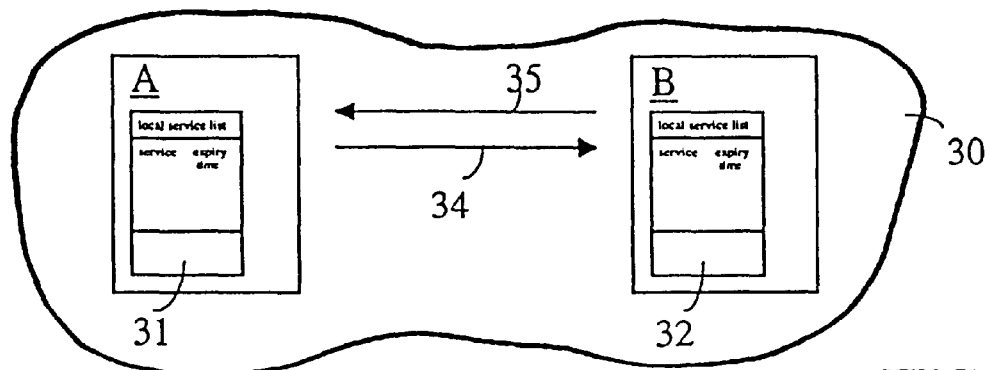
FIG. 2A is a schematic representation of a local network, in accordance with the present invention.
Figure 2B:
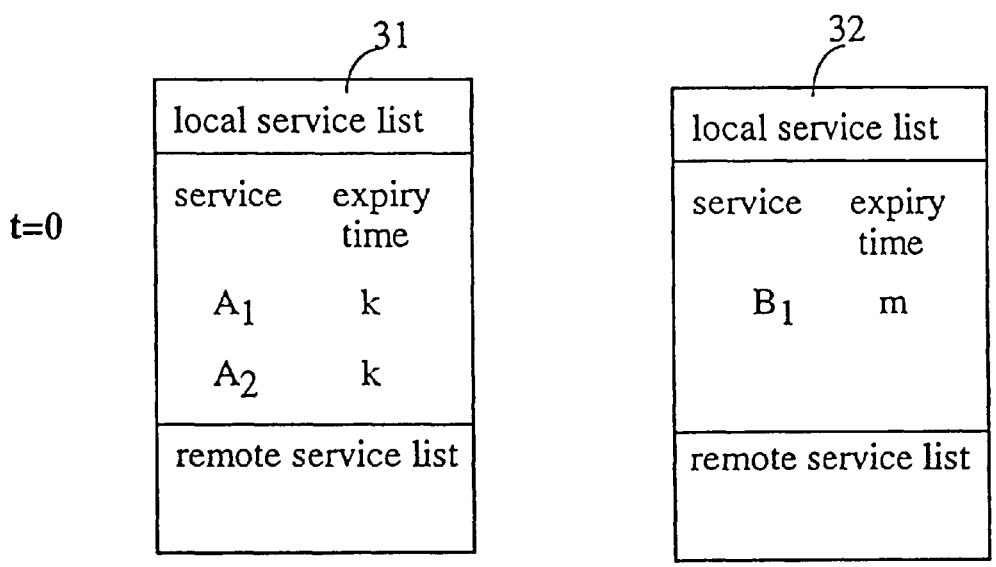
FIG. 2B is an example of local service lists (at t=0) used in connection with the present invention.

Alternate embodiments will now be described in connection with FIGS. 2A through 2F, FIG. 3, and FIG. 4. According to the present invention, a local network 30 with two devices A and B, is shown in FIG. 2A. There is a wireless link 34 from device B to A, and a wireless link 35 from A to B. These two devices, A and B, are the only devices in the local network 30. Each device comprises means to store service information. In the present embodiment the service information is stored in the form of lists 31 and 32. FIGS. 2B trough 2F show a sequence of steps. At t=0 (FIG. 2B) the service list 31 of device A contains only information concerning local services $A_1$ and $A_2$. There are no remote services known to device A. At this point in time the service list 32 of device B only comprises information concerning a local service $B_1$. An absolute time field is assigned to each service in the present embodiment. This time field is used to check whether local services are about to expire and if other services have expired. This field can also be used to detect whether a device is missing (e.g. a device was removed from scope the local network 30 area). In the present example the first transmission delay for device B has been randomly chosen to be $T_B \leq m$, where m is the expiry time chosen by B for its services. Note that although choosing a value for $T_B$ is often referred to as "choosing a new delay $T_B$," $T_B$ is compared with absolute time values. $T_B$ refers to the time resulting from the addition of the actual delay chosen to the time at which it was chosen, i.e. the end-time of the delay. The expiry times of services, referred to in this example as m and k, are may not be the same for all services offered by a single device, although this will often be the case. These values may be dependent on the expected mobility of the device, and will affect the number of retransmissions required, as the time between transmissions can be no shorter than the shortest expiry time of a service offered. Otherwise that service may expire in the lists held at client-devices. This step is illustrated by box 50 in FIG. 4. Device B has a clock means and checks the time 51. If $t=t_1 \geq T_B$ then the device B broadcasts service information via channel 35, as indicated by box 52. If a broadcast from another device (e.g. device A) would have been received before $t=t_1$ was reached, then a new random transmission delay $T_B$ would have been chosen by device B, as indicated by loop 53 in FIG. 4.

Figure 2C:
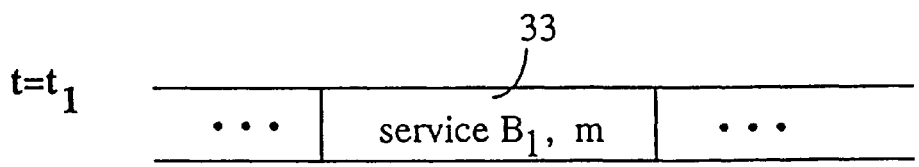
FIG. 2C is an example of a packet or frame used in connection with the present invention.
Figure 2D:
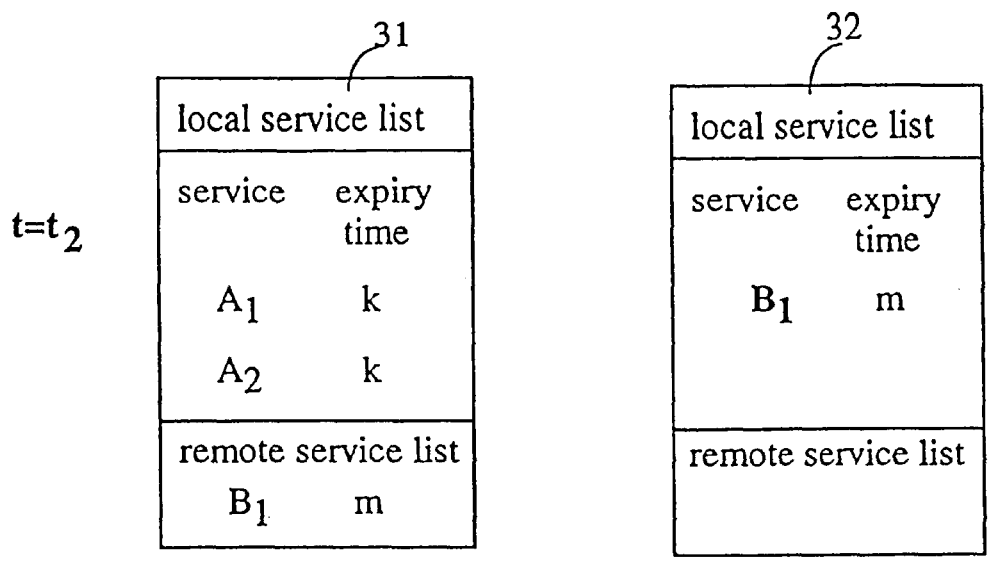
FIG. 2D is and example of local service list (at $t=t_2$) used in connection with the present invention.
Figure 2E:
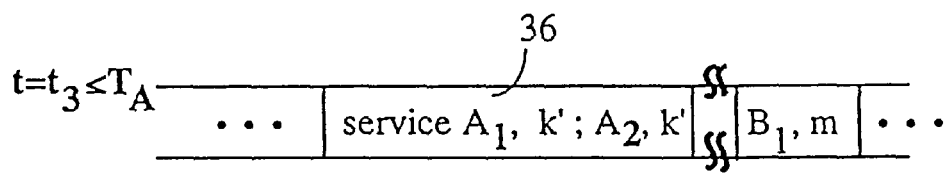
FIG. 2E is an example of another packet or frame used in connection with the present invention.
Figure 2F:
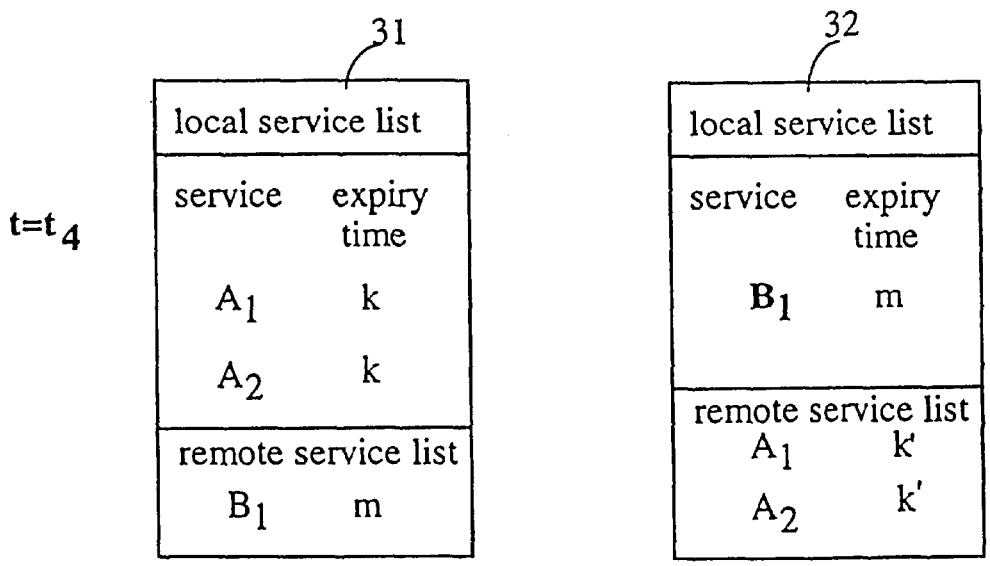
FIG. 2F is an example of local service lists (at $t=t_4$) used in connection with the present invention (where $t_1<t_2<t_3<t_4<t_5<t_6$)
Figure 3:
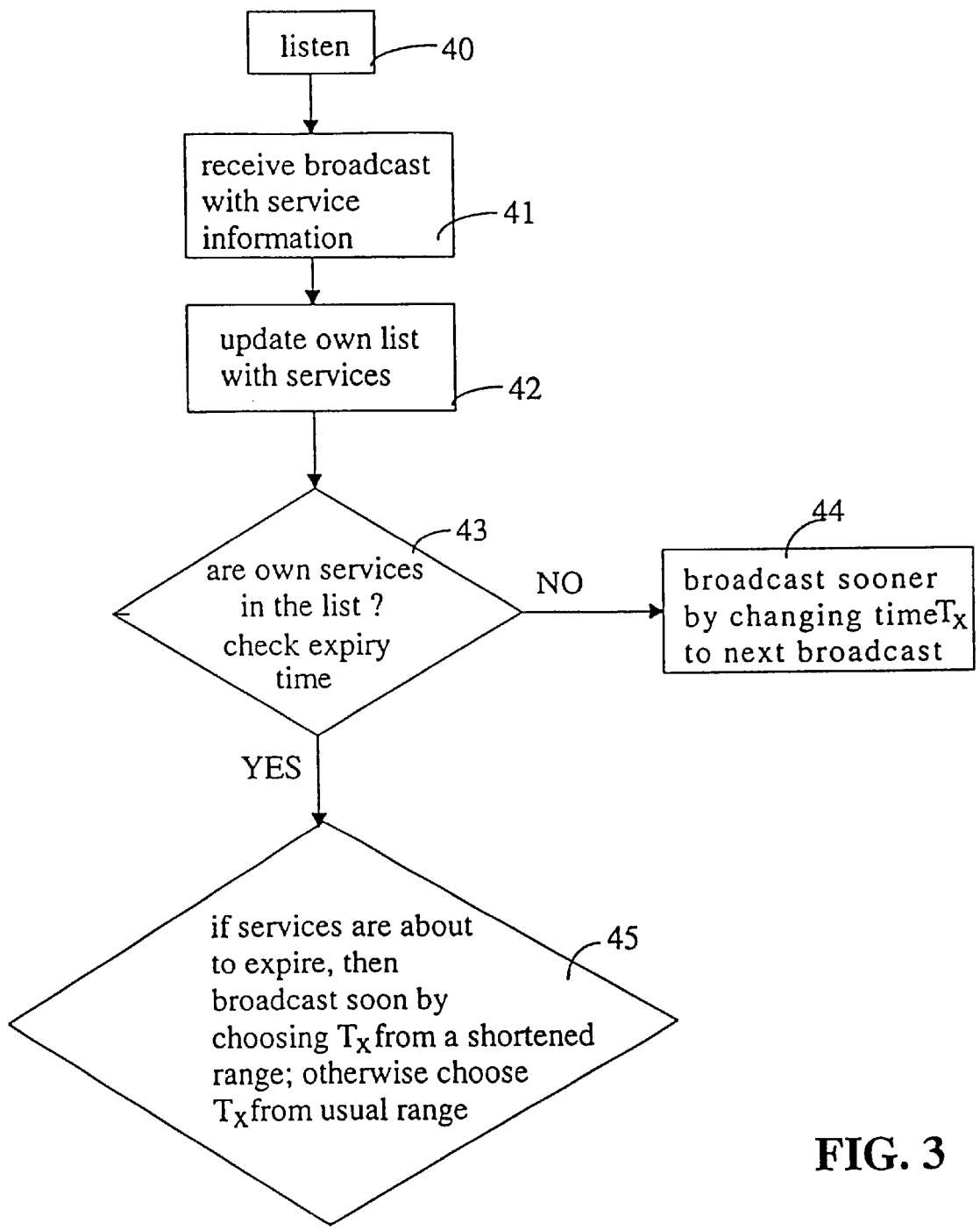
FIG. 3 is a schematic flowchart used to describe aspect of the present invention.
Figure 4:
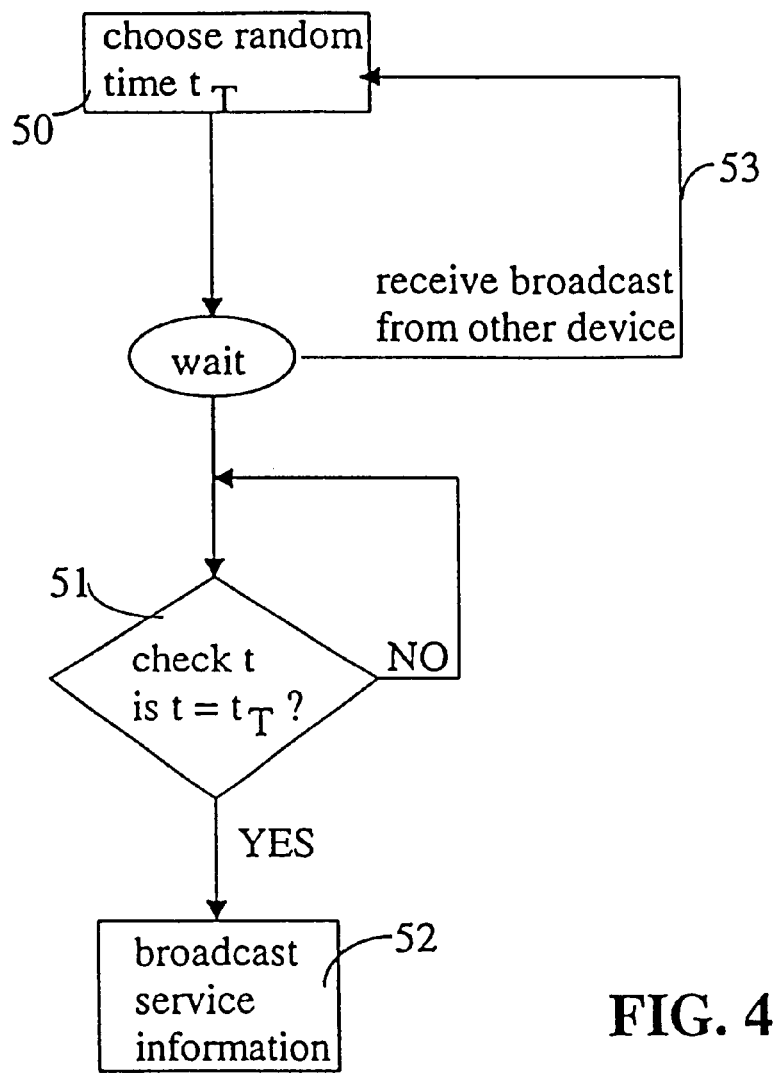
FIG. 4 is another flowchart used to describe aspect of the present invention.
Figure 5:
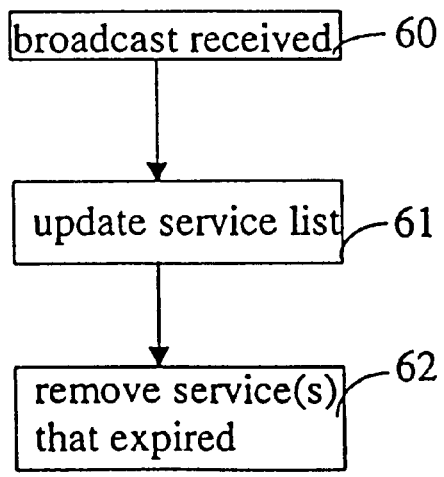
FIG. 5 is another schematic flowchart used to describe aspects of the present invention.

Device B now broadcasts service information in the form of a packet or frame 33. This broadcast takes place after the time $t=T_B$ is reached. In the present example the broadcast is assumed to occur at $t=t_1$, as shown in FIG. 2C. The packet or frame 33 at least comprises information concerning the type or kind of services rendered or provided by device B, and an associated expiry time m. the packet or frame 33 may comprise other information. The device A is assumed to have chosen the transmission delay $T_A > t_1$, which means that device A is in a listening state (box 40 FIG. 3) when device B starts to broadcast. At $t \geq t_1$ the device A receives the packet or frame 33 (box 410. Device A then updates at $t=t_2$ its own service list 31, as indicated in FIG. 2D and box 42 in FIG. 3. This service list 31 now comprises information concerning local services $A_1$ and $A_2$, as well as information concerning the remote service $B_1$. Part of the normal response by A to receiving a service list broadcast is to reset its time for the next broadcast $T_A$. When processing the service information received in packet or frame 33, the device A checks whether there is any information concerning its own services (box 43) in the packet or frame, and may use this information to determine a new $T_A$. In the present example this is not the case and device A chooses a new $T_A$ that is earlier (on average) than the value that would have been chosen otherwise. In the present example, the new value chosen for $T_A$ expires at $t_3$. In the present example, the services $A_1$ and $A_2$ expire at time $k \leq T_A$, chosen in some predefined way. The expiry of a service reflects the time after which other devices will no longer attempt to use it, as compared to the transmit timers ($T_A$ and $T_B$) that are in each device. The transmit timers determine how long a device waits for an advertisement from another device before making its own advertisement. This step is illustrated in box 44 of FIG. 3. The broadcast issued by device A is shown in FIG. 2E. The packet or frame 36 now comprises information about services provided by devices A and B. The packet or frame 36 is sent via channel 34 to device B. Device B is assumed to be in a listening state as shown in box 40 of FIG. 3, when device A begins to broadcast. Device B then updates at $t=t_4$ its own service list 32, as indicated in FIG. 2F and box 42 of FIG. 3. This service list 32 now comprises information concerning remote services $A_1$ and $A_2$, as well as information concerning the local service $B_1$. When processing the service information received in packet or frame 36, device B determines whether there is any information concerning its own services in box 43 in this packet or frame. In the present example this is the case, and device B chooses a new $T_B$ from the usual, predefined, range, and waits until this transmission delay is reached before it broadcast again. If the local services of device B are about to expire, it broadcasts sooner, e.g. by choosing a reduced transmission delay $T_B$ from a shortened (i.e. earlier) time range. Otherwise, the transmission delay $T_B$ is randomly chosen from the usual, predefined, time range. This is schematically illustrated by box 45 in FIG. 3.

When an advertisement is receive (discovery), the receiving device updates an internal list of available services from the received list. This involves updating timeouts for services already known, (e.g. by setting local entries' times to the earlier value, and remote entries' times to the later value) and adding entries for new services. This would also be a good time to remove expired entries.

Figure 6A:
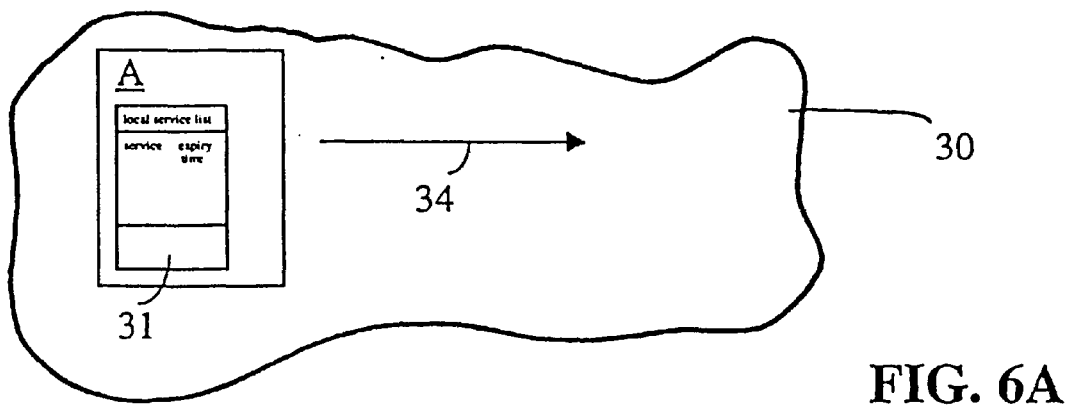
FIG. 6A is a schematic representation of another local network, in accordance with the present invention.
Figure 6B:
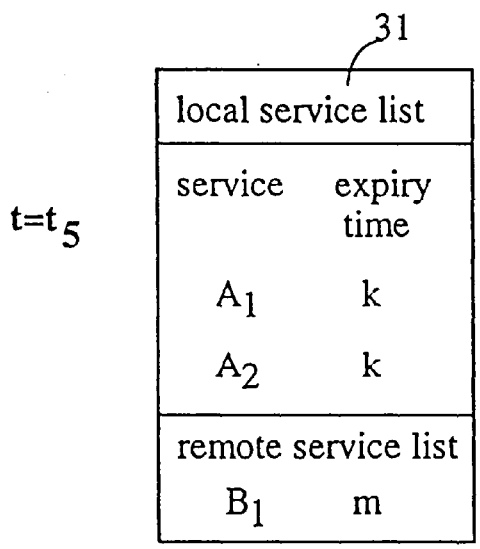
FIG. 6B is an example of a local service list (at $t=t_5$) used in connection with the present invention.
Figure 6C:
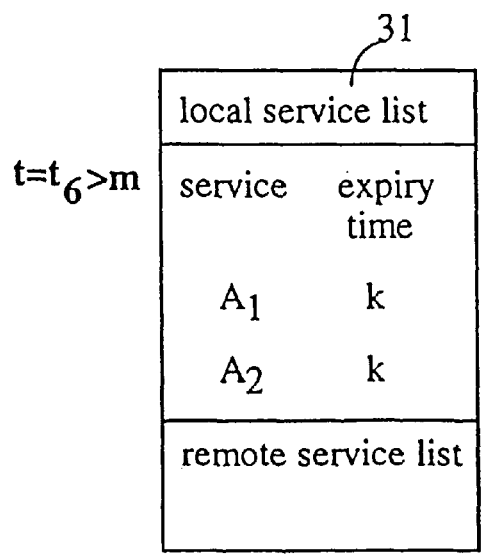
FIG. 6C is an example of a local service list (at $t=t_6$) used in connection with the present invention (with $t_5<t_6$)

The removal of services is described in connection with FIGS. 6A through 6C and FIG. 5. Whenever a broadcast is received as shown in box 60 FIG. 5, the list of services is updated, as discussed above. The updating is illustrated as box 61 in FIG. 5. It is now assumed that device B was removed from local network 30. The local network 30 now comprises device A, as shown in FIG. 6A. Device A may still be sending broadcasts, as shown by arrow 34, but no broadcasts are received from any other device. At the time $t=t_5$ the device A holds a service list 31 which is shown in FIG. 6B. In the present example, list 31 is similar to the list in FIG. 2D. It comprises local and remote services. Note that the remote service B, has an expiry time m. This expiry time is now used to remove entries of devices that have not been updated. At $t=t_6$, with $t_6 \geq m$, the service list 31 of device A is updated by removing the entry or remote service $B_1$. The resulting service list 31 is illustrated in FIG. 6C. Since there are no services of device B in the service list 31, the device A assumes the device B is not available. The reason for this can be that device B has left the network 30, that it was powered down, that the link was interrupted or down, or that B may have just stopped offering service $B_1$ for some other reason.

According to the present invention no feedback is required to acknowledge to the device that transmitted an advertisement that the respective transmission was received. A missing device can be identified by its failure to broadcast a list renewing the expiry times of its services, as will be noticed at steps 43 or 44 of FIG. 3, the next time device B sends its list. The services of the missing device timeout if the expiry time associated with services rendered or provided by this missing device expire. Likewise, the services of a missing device may age out by decrement or increment of a counter associated with the device's services.

Each device will periodically send its own list of entries as an advertisement. The probability of a device sending an advertisement will depend partially on the time since the last advertisement is known to have been broadcast, either sent or received. These service lists will include the latest known expiry time values for all services, setting its own service expiry times in the process. If a device sees that its local services will timeout soon, it will adjust its broadcast delay distribution to make it more likely to transmit soon. Thus, renewing the expiry times of its local services.

When an advertisement is received, the receiving device updates an internal list of available services from the received service information. This involves updating timeouts for services already known, (e.g. setting local entries' times to the earlier value, and remote entries' times to the later value) and adding entries for new services.

FIGS. 2C and 2E are schematic representations of a frame or packet, in accordance with the present invention, that are transmitted by a device of a local network to announce services to all other devices that are within reach. Depending on the MAC scheme used to avoid collisions, the frame or packet may comprise a MAC layer header. MAC layer headers are standardized and well known in the art. The MAC layer header may comprise information to identify the source and destination of the data packets, and may also contain other information fields (e.g. security control, medium access management, etc.). One service announcement may be spread across multiple MAC packets.

Another implementation of the present invention is now described. Consider an example situation involving an enabled wrist watch, desktop computer, and car radio. These devices are controlled by a user. In the present implementation example, the watch normally sends an advertisement every twenty to thirty seconds, the computer every five to ten seconds, and the car radio every fifteen to twenty-five seconds. For simplicity, it is assumed that the expiry time for every service is one minute.

A. The user is in bed and the watch has not seen any service advertisements for hours. All external services in its list have expired. The watch is sending periodic advertisements, and not receiving anything. The computer, unattended in the den is in the same state. Some implementations may choose to increase the delay between advertisements during these long disconnected periods, and some may choose to send empty lists (to save power) during these periods.

B. The user wakes up and goes to the den to check for e-mail and news. Eventually, an advertisement will be sent by either the watch or the computer. The other will receive this, and reset its own retransmit timer and, noticing its own services are missing from the list, will choose the new value from an earlier-than-usual range. For example, if the computer transmits first, the watch may reset itself to transmit fifteen seconds later. Since the computer will have reset its own timer to something in the range of five to ten seconds, the watch will receive another list that does not include its own services. This time, it might choose to broadcast seven seconds later. If the computer has chosen to broadcast nine seconds after its previous broadcast, then the watch will win this race, and the computer will now be aware of the watch's services.

C. Since the computer normally chooses smaller timeouts than the watch, it will continue to send a service list including both its own services and those of the watch every five or ten seconds. After nearly a minute of this, the watch will notice that its services are close to expiry, and begin to chose smaller and smaller retransmission timeouts until it eventually beats the computer to a timeout, and sends a list with both its own and the computer's services, having updated the expiry times on its own services to be a further minute into the future.

D. Reading e-mail, the user realizes an appointment in the very near future, and enters a car. When the car is started, the watch will notice the car radio. Perhaps the watch transmits first between these two. The list transmitted may still include the services of the computer, if they have not yet expired but, since the computer is no longer present to send renewals, the services will expire sixty seconds after the last advertisement actually received by the watch, and will not cause any extended confusion. The watch and radio will eventually reach a steady—state of alternating broadcast. Since the radio will usually choose smaller timeout values, it will broadcast more frequently, but the watch will occasionally choose an earlier time, and one or the other will send a list with both sets of services every twenty seconds or so.

E. Eventually, the user arrives at the meeting and exits the car. After about sixty seconds, both lists will have expired the entries of the other, and the two devices will again be aware of only their own services.

This implementation example illustrates the purpose of the present invention and demonstrates how it can be implemented to allow different devices to exchange service information.

The present invention can be used to transfer information between all sorts of devices as exemplified by means of the following. For example, many people carry multiple electronics devices, such as cellular phones, pagers, personal digital assistant, and digital watches. If each of these was equipped with the present technology, a person could receive a page, have the name of the person paging her appear on her watch, and phone that person simply by touching the 'send' button on her cellular phone. Using PAN, for example, the pager may send the phone number through the user's body to the PDA which finds the name and sends it to her watch. Such an automation increase accuracy and safety, especially in driving situations. The present invention provides the means to exchange information about the various services and thus lays the foundations for the above outlined example.

Another application of the present scheme is to pass simple data between electronic devices carried by two human beings, such as an electronic business card exchanged during a handshake. Before the two electronic devices exchange business card information in the form of user data, the respective service information and service parameters (such as the field comprised on the business cards, for example) are exchanged, according to the present invention.

The present scheme may also be used in the following situation. In order to automate and secure consumer business transactions, a public phone may be equipped with the means according to the present invention that would automatically identify the user, who would no longer have to input calling numbers and PINs. An application of the present scheme significantly simplifies the exchange of service information between the devices involved and allows the user's device (held or carried) to inform the public phone about the services provided and vice versa. This makes the act of calling easier and more convenient for users.

A scheme in accordance with the present invention can also be used to alert a user via a mobile phone if e-mail was received by their mobile PC, even while this mobile PC remains in its carrying case. When the PC receives an e-mail message, an alert will sound on the mobile phone. It is then possible to browse incoming e-mail immediately, reading the contents on the display of the mobile phone. Before all the respective user data is exchanges, a service announcement/discovery procedure according to the present invention is carried out.

It is important that all of the devices that are supposed to participate in service announcement and discovery within a local network, support a common service announcement protocol for exchange of the service information. Once a service has been announced, some or all devices may use other protocols for exchange of application-related information (user data).

The present scheme can be further modified by adding destination information to the service announcements. This can for example be done by adding address information to the header of a service announcement. Even though all the devices of a local network may read the respective service announcement, only the addresses devices will actually process the respective service announcement.

Note that the service announcements, according to the present invention, may be transmitted at any layer of an Open System Interconnection (OSI) protocol stack. The service announcements may for example be transmitted at the network protocol layer (3rd layer of the OSI stack) either as part of a network layer header, or as an attachment to a network layer header. The present invention relates to the service announcements and is thus independent of implementation details such as the protocol layer at which the respective information is exchanged.

It is understood by those skilled in the art that at the present time many of the protocols that are suited for use in wireless communications systems are still in draft status. The present scheme is independent of any particular protocol and can be used in connection with may such protocols. One skilled in the art is able to implement the present scheme in existing protocol environments as well as in protocol environments under development or yet to be developed.

The present invention enables users not only to transfer information straight from cards to palm size PCs but to synchronize entries between mobile devices and desktops. The present invention can be used to share services, to use services provided or rendered by other devices, and to compose or combine services. The present scheme handles devices arriving and leaving, and is further capable of finding replacement services for those that have been lost.

What is claimed is:

1. A method for advertising service offerings in a communications system having two devices, a first and a second device, comprising the steps of:
 a. transmitting from each device, service information, including information about itself wherein said two devices form an ad-hoc group;
  i. choosing a timeout value $T_A$, by each device;
  ii. listening by the first device, for up to said first device's timeout value $T_A$, for said service information sent by the second device;
  iii. if said first device timed out, return to step a, otherwise, determining whether said service information sent by the second device comprises information including local services information; if yes, continue with step i.; if no, return to step a.

2. The method of claim 1, wherein said two devices share a broadcast medium for advertising service offerings.

3. The method of claim 1 wherein said two devices are part of a local network.

4. The method of claim 1, wherein said two devices form an ad-hoc group.

5. The method of claim 1, wherein said two devices each broadcast their individual service information in a non-even statistical time distribution.

6. The method of claim 1, wherein one of said two devices acts as a master and the other as slave.

7. The method of claim 1, wherein at least one of said two devices is put into a power-saving mode by increasing its timeout value $T_A$ such that a small number of transmissions by said device occur in a given time frame.

8. The method of claim 2, wherein all devices within mutual communication range of each share said broadcast medium.

9. The method of claim 2, wherein said shared medium is an infrared (IR) channel, a radio-frequency (RF) channel, a HomeRF channel, or a Personal Area Network channel.

10. The method of claim 1, wherein said communications system has a coverage area between a few square meters and a few hundred square meters.

11. The method of claim 1, wherein each of said service offerings is described by means of a service identifier being transmitted as part of said service information.

12. The method of claim 11, wherein said service identifier is a flag or bit combination which describes standard types of services.

13. The method of claim 1, wherein said service information comprises a service parameter.

14. The method of claim 1, wherein said service information comprises expiry information associated with a service offering.

15. The method of claim 14, wherein said expiry information is an expiry time or an age field.

16. The method of claim 14, wherein said expiry information is used to age out the respective service.

17. The method of claim 16, wherein a device removes an expired service.

18. The method of claim 2, wherein said broadcast medium is also used for transmission of user data.

19. The method of claim 1, wherein said service information comprises a device identifier.

20. The method of claim 1, wherein said service information includes destination information.

21. The method of claim 1, wherein a first of said two devices receives said service information from the second of said two devices more often than it sends own service information.

22. The method of claim 1, wherein at least one of said two devices listens periodically for service information.

23. The method of claim 1, wherein at least one of said two devices alters its transmission probability distribution by reducing its timeout value $T_A$ to make it more likely that it will send service information, or increasing it to make it less likely to transmit service information.

24. An apparatus for exchanging service information with other devices, comprises a transceiver, a processing unit, a memory for storing information about its local services and/or services provided by other devices, and a protocol resource manager which a. triggers said transceiver to send service information, comprising information about itself and/or other known devices to their devices, b. triggers said transceiver to choose a timeout value $T_A$, c. ensures that the apparatus listens for up to a maximum time $T_A$ for service information received by said transceiver, d. if the transceiver timed out without having received said service information by said transceiver, triggers said transceiver to repeat step a, e. if said service information was received by said transceiver prior to said transceiver timing out, checks whether said service information received comprises information about itself, and f. if yes, then chooses another timeout value $T_A$, and continuing with step c, g. if no, then continuing with step a.

25. The apparatus of claim 24, comprising a MAC unit which is employed for the avoidance of collisions.

26. The apparatus of claim 24 being part of a local network, preferably a local network with a mesh topology.

27. The apparatus of claim 24, wherein said devices form an ad-hoc group.

28. The apparatus of claim 24, wherein said transceiver broadcasts said service information in a non-even statistical time distribution.

29. The apparatus of claim 24, wherein said device acts as a master.

30. The apparatus of claim 24, wherein said device has a power saving unit to put it into a power-saving mode by increasing said timeout value $T_A$ such that a small number of transmissions by said device occur in a given time frame.

31. The apparatus of claim 24, wherein said device intentionally decrease $T_A$ to increase the number of its transmissions, saving power for all other devices in the group.

32. The apparatus of claim 24, wherein said device sends empty service information to save power during periods where no advertisements are being received.

33. The apparatus of claim 24, wherein said transceiver is an infrared (IR) transceiver, a radio-frequency (RF) transceiver, a HomeRf transceiver, or a Personal Area Network transceiver.

34. The apparatus of claim 26, wherein said local network has a coverage area between a few square meters and a few hundred square meters.

35. The apparatus of claim 24, wherein said service information is described by means of service identifier.

36. The apparatus of claim 35, wherein said service identifier is a flag or bit combination which describes standard types of services.

37. The apparatus of claim 24, wherein said service information comprises a service parameter.

38. The apparatus of claim 24, wherein said service information comprises expiry information associated with a service offering.

39. The apparatus of claim 38, wherein said expiry information is an expiry time or an age field.

40. The apparatus of claim 38, wherein said expiry information is used to age out the respective service.

41. The apparatus of claim 40, wherein protocol resource manager removes an expired service.

42. The apparatus of claim 24, wherein said transceiver is also used for transmission of user data.

43. The apparatus of claim 24, wherein said service information comprises a device identifier.

44. The apparatus of claim 24, wherein said service information comprises destination information.

45. The apparatus of claim 24, wherein said protocol resource manager alters the transmission probability distribution of the transceiver by reducing its timeout value $T_A$ to make it more likely that it will send service information.

46. The apparatus of claim 24, wherein said protocol resource manager is implemented in hardware or software, or a combination of hardware and software.

* * * * *